Oct. 27, 1959   D. RICHMAN   2,910,581
PHASE DETECTOR
Filed June 9, 1954

United States Patent Office 2,910,581
Patented Oct. 27, 1959

2,910,581

PHASE DETECTOR

Donald Richman, Fresh Meadow, N.Y., assignor to Hazeltine Research, Inc., Chicago, Ill., a corporation of Illinois Application June 9, 1954, Serial No. 435,566

10 Claims. (Cl. 250—27)

This invention relates to phase detectors and, more particularly, to phase detectors of the type suitable for use in a color-television receiver for detecting the relative phases of a received color burst synchronizing signal and a locally generated subcarrier signal.

Various phase detectors have been proposed for use in color-television receivers but are subject to one or more undesirable limitations. One such phase detector utilizes a pair of diodes for effecting a dual phase comparison between a pair of signals applied thereto and has the disadvantage of being incapable of developing an amplified output signal representative of the relative phases of the applied signals. Another phase detector which is capable of providing such amplification has the disadvantages that it must be critically proportioned, is sensitive to power-supply variations, and supplies an output signal with respect to a reference voltage level other than may be desired for some applications.

It is an object of the present invention, therefore, to provide a new and improved phase detector for deriving an output signal representative of the relative phases of a pair of signals applied thereto which avoids one or more of the above-mentioned disadvantages and limitations of previously proposed detectors of the type described.

It is another object of the invention to provide a new and improved phase detector capable of developing an amplified output signal representative of the relative phases of the signals applied thereto.

It is another object of the invention to provide a new and improved phase detector capable of developing an output signal which is balanced with respect to a predetermined reference potential, for example, ground.

It is another object of the invention to provide a new and improved balanced phase detector of simple and inexpensive construction.

In accordance with a particular form of the invention, a balanced phase detector for deriving an output signal representative of the relative phases of a pair of signals applied thereto comprises a reference-signal first supply circuit and a second circuit for supplying a signal having a variable phase with respect to the reference signal. The detector includes an electron-discharge device having a pair of output electrodes and a single cathode and having a pair of control electrodes individually coupled to the supply circuits and jointly effective to cause different average variations of the currents to the output electrodes in response to a given variation of the relative phases of the signals. The detector also includes load circuit means coupled to the output electrodes and responsive to the average variations of the currents for developing a resultant signal having an amplitude representative of the relative phases of the reference and variable phase signals and balanced with respect to a predetermined reference potential.

For a better understanding of the present invention, together with other and further objects thereof, reference is had to the following description taken in connection with the accompanying drawing, and its scope will be pointed out in the appended claims.

Referring to the drawing.

Figure 1:
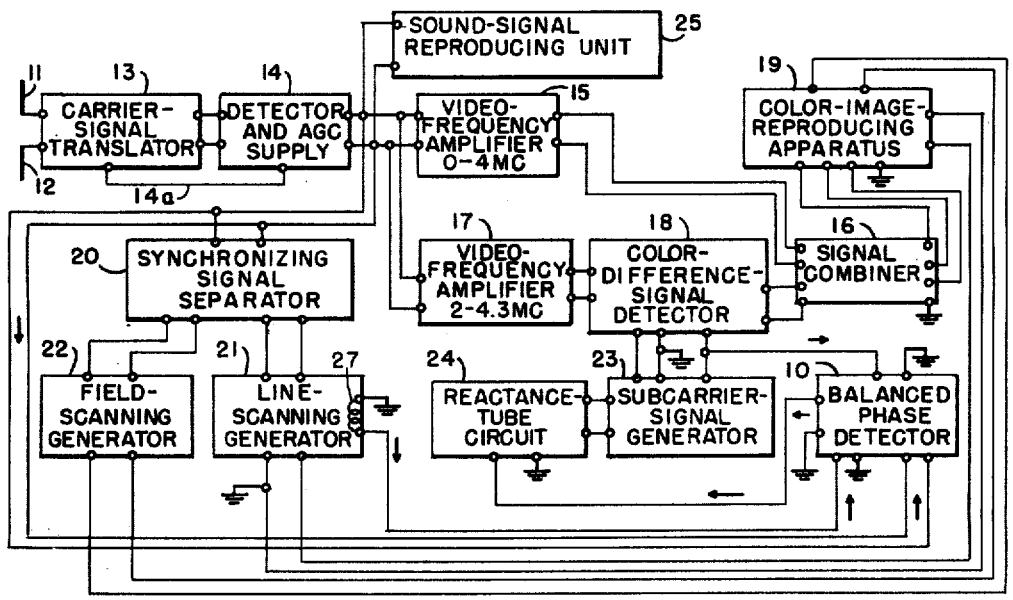
Fig. 1 is a schematic diagram of a color-television receiver including a phase detector constructed in accordance with the invention.

*General description of Fig. 1 color-television receiver*

Referring now more particularly to Fig. 1 of the drawing, there is represented a color-television receiver which, with the exception of a balanced phase detector 10 constructed in accordance with the invention and more fully described hereinafter, may be of a conventional type for reception of signals in accordance with the specifications described on pages 17–19 of the Proceedings of the IRE for January 1954.

The Fig. 1 receiver includes an antenna system 11, 12, a carrier-signal translator 13 which may be of the conventional superheterodyne type and a detector and automatic-gain-control or "AGC" supply 14, coupled in cascade and in the order named, for receiving a wave signal modulated by a composite color video-frequency signal and for deriving the latter signal therefrom. The AGC supply of unit 14 is coupled to the input circuit of one or more stages of unit 13 by a control-circuit conductor 14a.

There is connected to the detector and AGC supply 14 a video-frequency amplifier 15 for translating at least the low-frequency portion of the video-frequency signal, and preferably the frequency band of 0–4 megacycles comprising primarily the luminance signal component capable of reproducing an image substantially of the type normally reproduced in a conventional monochrome or black-and-white receiver and, thus, representative of the brightness and detail of the image. The output circuit of the video-frequency amplifier 15 is connected to an input circuit of a signal combiner 16 of a conventional type which may comprise, for example, three adders having individual input circuits coupled to the amplifier 15.

There is also connected to the output circuit of the detector of the unit 14 a signal-translating channel responsive to the modulated subcarrier signal component of the video-frequency signal derived by the detector for supplying three color-difference signals. This channel includes a video-frequency amplifier 17 having a pass band of, for example, 2–4.3 megacycles and a color-difference signal detector 18 coupled thereto and preferably comprising a matrixing system for deriving color-difference signals which jointly represent the chromaticity or color quality of an image definable by its dominant wave length and its purity taken together. The matrixing system of the detector 18 preferably is proportioned in accordance with the signal specifications to provide appropriate color-difference signals. The color-difference signal detector 18 has three output circuits individually connected to the input circuits of the three adders of the signal combiner 16 for supplying the color-difference signals thereto for combination with the luminance signal to develop three color signals individually representative of predetermined primary colors of the color image to be reproduced. The three output circuits of the signal combiner 16 are connected to input circuits of color-image-reproducing apparatus 19 which may comprise, for example, a three-gun multiphosphor cathode-ray tube of conventional construction for developing a composite color image having, for example, red, green, and blue components.

The receiver also includes a synchronizing-signal separator 20 for deriving the line-synchronizing and field-synchronizing signals from the video-frequency signals applied thereto by the unit 14. The output circuits of the separator 20 are connected to line-scanning and field-scanning generators 21 and 22, respectively, which, in turn, are connected in a conventional manner to the scanning circuits of the image-reproducing apparatus 19 for effecting scanning of the cathode-ray tube thereof.

The receiver also includes a balanced phase detector 10, constructed in accordance with the invention, having one input circuit connected to the unit 14 and responsive to the color burst synchronizing signal of the composite video-frequency signal derived by unit 14 and having another input circuit coupled to a subcarrier signal generator 23 of conventional phase-controlled oscillator design for applying to the detector 10 an unmodulated subcarrier signal for phase comparison with the color burst synchronizing signal. The line-scanning generator 21 is connected to another input circuit of the phase detector 10 for applying line-scan fly-back pulses thereto to key the phase detector, as will be more fully explained subsequently.

The output circuit of the phase detector 10 is connected to a reactance-tube circuit 24 of conventional construction connected, in turn, to an input circuit of the subcarrier signal generator 23 for controlling the instantaneous frequency and hence phase of the generator oscillations. The generator 23 has a pair of output circuits connected to the input circuits of the color-difference signal detector 18 for providing a pair of phase-displaced unmodulated subcarrier signals, for example, signals in phase quadrature for individually beating with the modulated subcarrier signal component applied to the color-difference signal detector by the amplifier 17 to derive the color-difference signals in the detector 18.

The television receiver also includes a sound-signal reproducing unit 25 of conventional construction connected to the detector of the unit 14 and comprising the usual sound intermediate-frequency amplifier, frequency-modulation detector, audio-frequency amplifier, and loudspeaker.

*General operation of Fig. 1 color-television receiver*

Considering briefly the operation of the Fig. 1 receiver as a whole, a modulated color-television wave signal intercepted by the antenna system 11, 12 is selected by the carrier-signal translator 13 which amplifies and converts the same to an intermediate-frequency signal and supplies that signal to the detector of the unit 14. The detector of unit 14 derives the modulation components comprising a video-frequency signal having a luminance component comprising the frequency band of, for example, 0–4 megacycles. The video-frequency signal is translated through the video-frequency amplifier 15 to the signal combiner 16 for combination with color-difference signals supplied thereto in a manner more fully explained hereinafter.

For the purpose of developing color images in the color-image-reproducing apparatus 19, a modulated subcarrier signal component in the frequency band of 2–4.3 megacycles of the video-frequency signal derived by the detector of the unit 14 is translated through the video-frequency amplifier 17 and applied to the color-difference signal detector 18. The quadrature-phase subcarrier output signals of the stabilized subcarrier signal generator 23 beat with the modulated subcarrier signal component applied to the color-difference signal detector to develop in the individual output circuits thereof separate color-difference signals individually including 0–2 megacycle frequency bands and comprising the modulation components of the modulated subcarrier signal component and which, relative to the luminance signal component, individually represent the chromaticity components of the predetermined primary colors of the composite color image to be reproduced, for example, the red, green, and blue chromaticity components. The red, green, and blue color-difference signals then effectively are individually combined in the signal combiner 16 with the luminance component applied thereto to provide, for example, red, green, and blue color signals individually representative of the intensities of predetermined primary colors of the image to be reproduced, which are applied to the apparatus 19 in a conventional manner.

The synchronizing-signal components of the video-frequency signal developed in the output circuit of the unit 14 are separated from the luminance and color-difference signal components by the separator 20 and are applied to the line-scanning and field-scanning generators 21 and 22 to synchronize the operation thereof. These generators preferably supply signals of saw-tooth wave form for application to the deflection circuits of the color-image-reproducing apparatus 19 to control the line-scanning and field-scanning operations thereof.

In a manner more fully explained hereinafter, the balanced phase detector 10 responds to the color burst synchronizing signal applied thereto by the unit 14, to the output signal of the subcarrier signal generator 23, and to the fly-back pulse of the output signal of the line-scanning generator 21 for deriving a signal representative of the relative phases of the color burst synchronizing signal and the subcarrier signal. The phase detector 10 applies the derived signal to the reactance-tube circuit 24 to control the effective reactance thereof in a conventional manner and thus to control the phases of the output signals of the generator 23 in a conventional manner.

The automatic-gain-control or AGC signal derived in unit 14 is effective to control the amplification of one or more stages of the unit 13 to maintain the signal input to the detector of the unit 14 within a relatively narrow range for a wide range of received signal intensities.

In accordance with the operating principles of an intercarrier television receiver, the sound intermediate-frequency signal supplied by the carrier-signal translator 13 beats in the detector of the unit 14 with the picture intermediate-frequency signal to derive a second sound intermediate-frequency signal in the detector output circuit. This sound intermediate-frequency signal is amplified in the unit 25 and the audio-frequency modulation components thereof are derived and converted into sound in a conventional manner.

Figure 2:
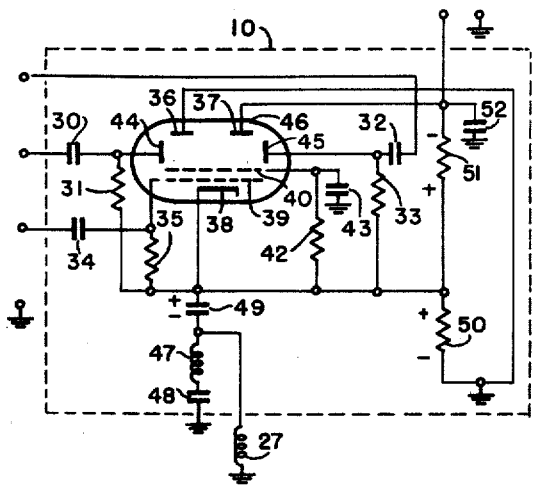
Fig. 2 is a detailed circuit diagram of one embodiment of such a phase detector constructed in accordance with the invention.

*Description of Fig. 2 phase detector*

Referring now more particularly to Fig. 2 of the drawing, there is represented a detector constructed in accordance with the invention for deriving an output signal representative of the relative phases of a pair of signals applied thereto. The detector comprises a reference-signal first supply circuit for supplying, for example, the color burst synchronizing signal and comprising, for example, coupling condenser-leak-resistor networks 30, 31 and 32, 33. The detector also includes a second circuit for supplying a signal having a variable phase with respect to the reference signal comprising, for example, a coupling condenser-leak-resistor network 34, 35 for supplying a variable phase subcarrier signal.

The detector 10 also includes electrode-controlled circuit means having a pair of output electrodes and having a pair of control electrodes individually coupled to the first and second supply circuits and jointly effective to control the currents to one or both of the output electrodes in accordance with the relative phases of the signals. This electrode-controlled circuit means preferably comprises an electron-discharge tube 46 of the beam-switching type having a pair of anodes 36, 37, a cathode 38, a first control electrode or grid 39 connected to the subcarrier signal supply circuit, a screen electrode 40 connected through a leak resistor 42 to the cathode 38 and dynamically coupled through a pulsating-signal by-pass condenser 43 to the anode 36, and a beam-switching electrode comprising elements 44, 45 for controlling the relative currents to the anodes 36, 37 in accordance with the relative phases of the burst and subcarrier signals. The tube 46 may, for example, be of the 6AR8 type manufactured and advertised for sale by the General Electric Company or of the type described in an article by Adler and Hever entitled "Color Decoder Simplifications Based on Beam Deflection Tube," published in the "Transactions of the IRE Professional Group on Broadcast and Television Receivers," January 1954.

Pulsating-signal energizing-circuit means is dynamically coupled to the primary electrodes of the tube 46, that is, to the anodes and cathode thereof, in statically open circuit for energizing the tube with signal pulsations. More particularly, the energizing circuit means comprises, for example, a line-scan fly-back pulse-supply circuit connected to an output winding 27 of the line-scanning generator 21 of Fig. 1 and including a suitable impedance network comprising inductor 47 and condenser 48. The inductor 47 and condenser 48 preferably are series resonant at the subcarrier frequency but have a substantial impedance at the line-scan frequency for developing line-scan fly-back pulses thereacross. A coupling condenser 49 is connected between the cathode 38 and the inductor 47 for applying the line-scan fly-back pulses to the cathode.

There is coupled to the output electrodes 36, 37 circuit means responsive to the anode currents for developing a resultant signal having an amplitude representative of the relative phases of the color burst and subcarrier signals. This circuit means comprises, for example, resistors 50, 51 included in direct-current return paths from the anodes 36, 37 to the cathode 38 for developing average output voltages of opposite polarity with respect to the voltage level at the anode 36 in response to phase variations of the burst and the subcarrier. The anode 36 may, for example, be grounded or may be connected to one terminal of the fly-back pulse-supply circuit through any suitable circuit of low dynamic impedance which may include a source of reference potential. The anode 37 is also dynamically coupled to one terminal of the fly-back pulse-supply circuit as, for example, by a coupling condenser 52, thereby preventing signal pulsations from developing across resistor 51.

*Operation of Fig. 2 phase detector*

Considering now the operation of the phase detector 10, it will be assumed initially that the subcarrier signal generator is stabilized by its associated control circuits when, for example, the output signal thereof applied to the control electrode 39 of the tube 46 leads the color burst synchronizing signal by 90°. During fly-back pulse intervals, the cathode of the tube 46 is driven negative with respect to the anode 36 thereof, rendering the tube 46 conductive. In this operating condition, while the tube 46 is conductive and during half cycles of the color burst synchronizing signal which drive the beam switching electrode 44 positive with respect to the element 45, anode-cathode current of the tube 46 flows to the anode 36.

The direct-current component or average value of this current over conductive and nonconductive intervals of the tube 46 is determined by the anode-cathode and screen-cathode potentials and the phase relation of the subcarrier signal applied to the control electrode 39 and the color burst synchronizing signal applied to the electrodes 44, 45. The direct-current component flows through the anode 36 and cathode 38 of the tube 46 and through the resistor 50 to develop an average voltage component across the resistor 50 having a polarity as indicated in the drawing. Since the condenser 49 is connected across the resistor 50 through the negligible direct-current impedance of the output winding 27 of the line-scanning generator 21, the condenser 49 acquires an average voltage equal to the average voltage across resistor 50, with the polarity indicated in the drawing.

Also, while the tube 46 is conductive and during half cycles of the color burst synchronizing signal when the beam-switching element 45 is positive with respect to the element 44, anode-cathode current of the tube 46 flows to the anode 37. The anode-cathode current averaged over conductive and nonconductive intervals of the tube 46 flows through the anode 37 and cathode 38 of the tube 46, and through the resistor 51 to develop an average voltage component across the resistor having a polarity as indicated in the drawing. Under the assumed operating conditions, the anode currents of the tube 46 have the same average value, and since the resistors 50 and 51 have the same resistance, the average voltage components developed thereacross have the same value, providing a resultant output voltage of zero value. Accordingly, the average voltage across the condenser 52 has zero value with respect to the applied reference potential, in this case ground.

When the phase of the signal applied to the control electrode 39, for example, leads the color burst synchronizing signal by less than 90°, the average current through anode 36 increases and the average current through anode 37 decreases by the same amount. Accordingly, the average voltage drop across the resistor 50, and thus, the voltage drop across condenser 49, increases, while the average voltage drop across resistor 51 decreases by the same amount. Thus, a net positive voltage double the differential voltage across resistor 50 or 51 is developed across condenser 52.

Similarly, when the subcarrier signal applied to the electrode 39 leads the color burst synchronizing signal applied to the elements 44, 45 by more than 90°, the average voltage drop across resistor 51 increases, while the average voltage drop across resistor 50 decreases by the same amount, causing a negative voltage to be developed across condenser 52. Because of symmetrical variations of average anode currents of the tube in response to relative phase variations of the applied signals, the resultant output voltage varies in a balanced manner with respect to ground with phase leads or lags from the reference quadrature phase relation.

Figure 3:
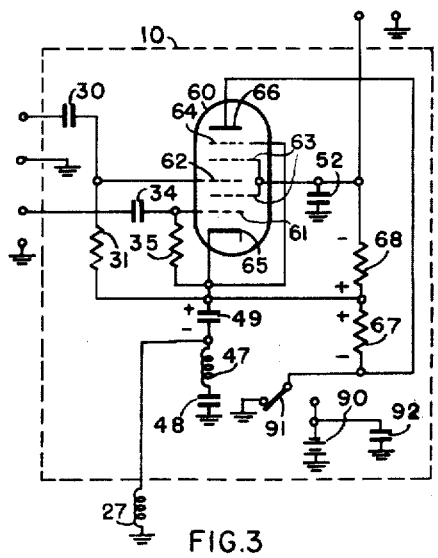
Fig. 3 is a detailed circuit diagram of another embodiment of the phase detector constructed in accordance with the invention.

*Description and operation of Fig. 3 detector*

Referring now to Fig. 3 of the drawing, there is represented a phase detector constructed in accordance with another form of the invention. The phase detector of the Fig. 3 embodiment differs from the phase detector of the Fig. 2 embodiment in that it utilizes an electron-discharge tube 60 of the pentagrid type in lieu of a tube of the beam-switching type. The tube 60 has a first control electrode 61 connected to a subcarrier supply circuit and a second control electrode 62 connected to the color burst supply circuit. The tube also has a screen electrode 63 serving as an anode and a suppressor electrode 64 connected to the cathode 65. The tube also has an anode 66 which may, for example, be grounded and is coupled through resistor 67 to the cathode. Resistors 67 and 68 preferably have values determined in accordance with the inverse ratio of average anode current to average screen current for a given phase relation of the subcarrier with respect to the burst to provide a balanced signal output characteristic for the phase detector. Elements of the Fig. 3 embodiment corresponding to those of the Fig. 2 embodiment have the same reference numerals.

The operation of the Fig. 3 phase detector is analogous to the operation of the Fig. 2 detector. Assume initially that the subcarrier signal generator is stabilized by its associated control circuits when, for example, the output signal thereof applied to the control electrode 61 of the tube 60 leads the color burst synchronizing signal by 90°. During fly-back pulse intervals, the cathode of the tube 60 is driven negative with respect to the anode 66 and the control electrode 62 thereof, rendering the tube 60 conductive. In this operating condition while the tube 60 is conductive and during half cycles of the color burst synchronizing signal which drive the second control electrode 62 in a positive sense, a major portion of the controlled fraction of the space current of the tube flows to the anode 66 as opposed to the screen electrode 63.

The direct-current component or average value of this current over conductive and nonconductive intervals of the tube 60 is determined by the anode-cathode and screen-cathode potentials and the phase relation of the subcarrier applied to the control electrode 61 and the color burst synchronizing signal applied to the control electrode 62. The direct-current component flows through the anode 66 and cathode 65 of the tube 60 and through the resistor 67 to develop an average voltage component across the resistor 67 having a polarity as indicated in the drawing. Since the condenser 49 is connected across the resistor 67 through the negligible direct-current impedance of the output winding 27 of the line-scanning generator 21, the condenser 49 acquires an average voltage equal to the average voltage across resistor 67 with the polarity indicated in the drawing.

Also, while the tube 60 is conductive and during half cycles of the color burst synchronizing signal when the second control electrode 62 is driven in a negative sense, a major portion of the space current of the tube 60 flows to the screen electrode 63 as opposed to the anode 66. The screen-cathode current averaged over conductive and nonconductive intervals of the tube 60 flows through the screen electrode 63 and cathode 65 of the tube 60 and through the resistor 68 to develop an average voltage component across the resistor 68 having a polarity as indicated in the drawing. Under the assumed operating conditions, the screen current and the anode current of the tube 60 have a predetermined ratio of average values, for example, 3 to 1 for a 90° phase lead of the subcarrier with respect to the color burst synchronizing signal. These average currents develop across the resistors 68 and 67 average voltage components providing a predetermined resultant output reference voltage, for example, zero volts, also developed across the condenser 52.

When the phase of the subcarrier applied to the control electrode 61, for example, leads the color burst synchronizing signal applied to the second control electrode 62 by less than 90°, the average current through anode 66 increases and the average current through the screen electrode 63 decreases. The ratio of average anode-current variation to average screen-current variation is determined by the tube characteristics. At one illustrative operating condition, the anode current is approximately one-third the screen current for a 90° phase relation, while any differential currents due to phase changes will be equal in magnitude but of opposite sense. Since the resistors 67 and 68 preferably have values determined in accordance with the inverse ratio of average anode current to average screen current at the nominal point, then for a given phase variation of the subcarrier with respect to the burst, the average voltage drop across resistor 67 increases by, for example, three times the amount that the average voltage drop across resistor 68 decreases. Accordingly, the resultant average voltage drop across the condenser 52 increases by an amount which may, for example, be four-thirds of the differential voltage across resistor 67 or four times that across resistor 68.

Similarly, when the subcarrier signal applied to the control electrode 61 leads the color burst synchronizing signal applied to the second control electrode 62 by more than 90°, the average anode current through the resistor 67 decreases while the average screen current through the resistor 68 increases in accordance with the predetermined ratio of anode-current and screen-current variation. Thus, the average voltage drop across resistor 67 decreases while the average voltage drop across resistor 68 increases in the ratio previously discussed, causing the average voltage across condenser 52 to decrease.

Because of at least approximately symmetrical variations of average voltages developed across resistors 67 and 68 in response to relative phase variations of the applied signals, the resultant output voltage varies approximately symmetrically about a predetermined reference voltage with phase leads or lags from the reference quadrature-phase relation. This voltage variation may be balanced with respect to ground or any other arbitrary potential by connecting a suitable source of unidirectional potential, such as battery 90 by-passed by condenser 92, into the circuit by means of switch 91 between anode 66 and ground.

From the foregoing description, it may be seen that a phase detector constructed in accordance with the invention has the advantage that it may utilize a single electron-discharge tube having a minimum of five electrodes or its equivalent and that it is capable of developing an output signal which is balanced with respect to a predetermined reference potential, for example, ground. This reference potential may be controlled by any suitable low-impedance means. The phase detector also has the advantage that its output signal is amplified as compared with the average voltage level of the input signals.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A balanced phase detector for a color-television receiver for detecting the relative phases of a received color burst synchronizing signal and a locally generated subcarrier signal comprising: a color burst supply circuit; a variable-phase subcarrier supply circuit; an electron-discharge tube of the beam-switching type having a pair of anodes one of which is grounded, a cathode, a first control grid connected to the subcarrier supply circuit, a screen, and a beam-switching electrode connected to the burst supply circuit for controlling the relative currents to the anodes in accordance with the relative phases of the burst and subcarrier; a line-scan fly-back pulse supply circuit dynamically connected between the cathode and screen and the cathode and pair of anodes of the tube for keying the tube in statically open circuit for keying the tube into conduction during fly-back intervals; D.-C. return paths from all of the electrodes to the cathode, the return paths from the anodes to the cathode including a pair of resistors responsive to the anode currents for developing average output voltages of opposite polarity with respect to ground in response to phase variations of the burst and subcarrier, and the sum of the voltages with respect to ground changing in polarity and amplitude in a balanced manner with the lead or lag of the subcarrier from a reference quadrature phase with respect to the burst.

2. A balanced phase detector for deriving an output signal representative of the relative phases of a pair of signals applied thereto comprising: a reference-signal first supply circuit; a second circuit for supplying a signal having a variable phase with respect to said reference signal; an electron-discharge device having a pair of output electrodes and a single cathode and having a pair of control electrodes individually coupled to said supply circuits and jointly effective to cause different average variations of the currents to said output electrodes in response to a given variation of the relative phases of said signals; and load circuit means coupled to said output electrodes and responsive to said average variations of said currents for developing a resultant signal having an amplitude representative of the relative phases of said signals and balanced with respect to a predetermined reference potential.

3. A balanced phase detector for a color-television receiver for deriving an output signal representative of the relative phases of a received color burst synchronizing signal and a locally generated subcarrier signal comprising: a color burst synchronizing-signal first supply circuit; a second circuit for supplying a subcarrier signal having a variable phase with respect to said synchronizing signal; an electron-discharge device having a pair of output electrodes and having a pair of control electrodes individually coupled to said supply circuits and jointly effective to cause different average variations of the currents to said output electrodes in response to a given variation of the relative phases of said signals; and load circuit means coupled to said output electrodes and responsive to said average variations of said currents for developing a resultant signal having an amplitude representative of the relative phases of said signals and balanced with respect to a predetermined reference potential.

4. A detector for deriving an output signal representative of the relative phases of a pair of signals applied thereto comprising: a reference-signal first supply circuit; a second circuit for supplying a signal having a variable phase with respect to said reference signal; an electron-discharge device having a pair of output primary electrodes and a third primary electrode and having a pair of control electrodes; pulsating-signal energizing circuit means dynamically coupled to said primary electrodes in statically open circuit for energizing said device with signal pulsations; said pair of control electrodes being individually coupled to said first and second supply circuits and jointly effective to control the currents to one or both of said output electrodes in accordance with the relative phases of said signals; and circuit means coupled to said output electrodes and responsive to said currents for developing a resultant signal having an amplitude representative of the relative phases of said signals.

5. A detector for deriving an output signal representative of the relative phases of a pair of signals applied thereto comprising; a reference-signal first supply circuit; a second circuit for supplying a signal having a variable phase with respect to said reference signal; an electron-discharge tube having a pair of output electrodes, a cathode, and a pair of control electrodes; pulsating-signal energizing-circuit means dynamically coupled to said output electrodes and said cathode in statically open circuit for energizing said electron-discharge tube with signal pulsations; said pair of control electrodes being individually coupled to said first and second supply circuits and jointly effective to control the currents to one or both of said output electrodes in accordance with the relative phases of said signals; and circuit means coupled to said output electrodes and responsive to said currents for developing a resultant signal having an amplitude representative of the relative phases of said signals.

6. A detector for deriving an output signal representative of the relative phases of a pair of signals applied thereto comprising: a reference-signal first supply circuit; a second circuit for supplying a signal having a variable phase with respect to said reference signal; an electron-discharge tube of the beam-switching type having a pair of anodes, a cathode, and a pair of control electrodes; pulsating-signal energizing-circuit means dynamically coupled to said anodes and cathode in statically open circuit for energizing said electron-discharge tube with signal pulsations; said pair of control electrodes being individually coupled to said first and second supply circuits and jointly effective to control the currents to one or both of said anodes in accordance with the relative phases of said signals; and circuit means coupled to said output electrodes and responsive to said currents for developing a resultant signal having an amplitude representative of the relative phases of said signals.

7. A detector for deriving an output signal representative of the relative phases of a pair of signals applied thereto comprising: a reference-signal first supply circuit; a second circuit for supplying a signal having a variable phase with respect to said reference signal; an electron-discharge tube having an anode, a screen electrode, a cathode, and a pair of control electrodes; pulsating-signal energizing-circuit means dynamically coupled to said anode, screen electrode, and cathode in statically open circuit for energizing said electron-discharge tube with signal pulsations; said pair of control electrodes being individually coupled to said first and second supply circuits and jointly effective to control the currents to said anode and screen electrode in accordance with the relative phases of said signals; and circuit means coupled to said output electrodes and responsive to said currents for developing a resultant signal having an amplitude representative of the relative phases of said signals.

8. A detector for deriving an output signal representative of the relative phases of a pair of signals applied thereto comprising: a reference-signal first supply circuit; a second circuit for supplying a signal having a variable phase with respect to said reference signal; an electron-discharge device having a pair of output primary electrodes and a third primary electrode and having a pair of control electrodes; pulsating-signal energizing-circuit means dynamically coupled to said primary electrodes in statically open circuit for energizing said device with signal pulsations; said pair of control electrodes being individually coupled to said first and second supply circuits and jointly effective to control the currents to one or both of said output electrodes in accordance with the relative phases of said signals; direct-current return paths coupled between said output electrodes and said cathode and between said control electrodes and said cathode, said output electrode-cathode return paths including resistors for developing average output voltages of opposite polarity with respect to the voltage level at one of said output electrodes to derive a resultant differential voltage having an amplitude representative of the relative phases of said signals.

9. A balanced phase detector for deriving an output signal representative of the relative phases of a pair of signals applied thereto comprising: a reference-signal first supply circuit; a second circuit for supplying a signal having a variable phase with respect to said reference signal; a third circuit for supplying a gating signal during predetermined repetitive intervals; electron-discharge means having separate output electrodes and associated control electrodes coupled to said supply circuits, said electron-discharge means being responsive to the same gating signal and to the relative phases of said variable-phase and reference signals only during said predetermined intervals to cause different average current variations to the output electrodes; and load circuit means coupled to the output electrodes and responsive to said average current variations for deriving a resultant signal having a magnitude representative of said relative phases during said intervals and balanced with respect to a predetermined reference potential.

10. In a color-television receiver, a balanced phase detector for deriving an output signal representative of the relative phases of a pair of signals applied thereto comprising: a first circuit for supplying a chrominance subcarrier signal including a repetitive color burst component; a second circuit for supplying a signal having a variable phase with respect to said subcarrier signal; a line-scan fly-back pulse-supply circuit for supplying a gating pulse during the intervals of said color burst component; electron-discharge means having separate output electrodes and associated control electrodes coupled to said supply circuits, said electron-discharge means being responsive to the same gating pulse and to the relative phases of said variable-phase and subcarrier signals only during said intervals of said color burst component to cause different average current variations to the output electrodes; and load circuit means coupled to the output electrodes and responsive to said average current variations for deriving a resultant signal having a magnitude representative of said relative phases during said intervals and balanced with respect to a predetermined reference potential.

References Cited in the file of this patent

UNITED STATES PATENTS

| | | |
|---|---|---|
| 2,211,942 | White | Aug. 20, 1940 |
| 2,294,659 | Herold | Sept. 1, 1942 |
| 2,640,103 | Clements | May 26, 1953 |
| 2,656,414 | Roschke et al. | Oct. 20, 1953 |
| 2,683,802 | Williams | July 13, 1954 |
| 2,695,361 | Norton | Nov. 23, 1954 |
| 2,713,606 | Sziklai | July 19, 1955 |
| 2,762,978 | Norton | Sept. 11, 1956 |
| 2,763,808 | Lurcott | Sept. 18, 1956 |
| 2,774,038 | Stavis | Dec. 11, 1956 |
| 2,775,691 | Rennick | Dec. 25, 1956 |

FOREIGN PATENTS

| | | |
|---|---|---|
| 1,072,193 | France | Mar. 10, 1954 |

OTHER REFERENCES

Farr: "Compatible Color TV Receiver," Electronics, January 1953, pages 98–104.